United States Patent
Du et al.

(10) Patent No.: US 7,975,040 B2
(45) Date of Patent: *Jul. 5, 2011

(54) SYSTEMS AND METHODS FOR VIRTUALIZING FUNCTIONS AND DECENTRALIZING SERVICE DELIVERY IN A FLAT NETWORK OF INTERCONNECTED PERSONAL DEVICES

(75) Inventors: John Du, Beaverton, OR (US); John Vicente, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,338

(22) Filed: Apr. 5, 2010

(65) Prior Publication Data
US 2010/0318643 A1  Dec. 16, 2010

Related U.S. Application Data

(63) Continuation of application No. 11/027,493, filed on Dec. 30, 2004, now Pat. No. 7,693,977.

(51) Int. Cl.
*G06F 15/173* (2006.01)
(52) U.S. Cl. ......... 709/223; 709/224; 370/401; 455/557
(58) Field of Classification Search ................ 709/223, 709/224, 232; 370/327, 338, 401, 466; 455/557
See application file for complete search history.

(56) References Cited

U.S. PATENT DOCUMENTS

| | | | | |
|---|---|---|---|---|
| 6,055,575 | A * | 4/2000 | Paulsen et al. | 709/229 |
| 6,681,116 | B1 * | 1/2004 | Johnson | 455/552.1 |
| 6,765,921 | B1 * | 7/2004 | Stacey et al. | 370/401 |
| 7,693,977 | B2 | 4/2010 | Du et al. | |
| 2002/0094799 | A1 * | 7/2002 | Elliott et al. | 455/405 |
| 2004/0081105 | A1 * | 4/2004 | Shimazaki et al. | 370/254 |
| 2005/0215287 | A1 * | 9/2005 | Efland et al. | 455/562.1 |
| 2006/0155806 | A1 | 7/2006 | Du et al. | |
| 2008/0039055 | A1 * | 2/2008 | Hannikainen et al. | 455/414.1 |
| 2008/0077767 | A1 | 3/2008 | Khosravi et al. | |
| 2008/0162625 | A1 * | 7/2008 | Sedayao et al. | 709/202 |

OTHER PUBLICATIONS

"U.S. Appl. No. 11/027,493 Non-Final Office Action mailed Oct. 1, 2008", 14 Pgs.
"U.S. Appl. No. 11/027,493, Final Office Action mailed Jun. 2, 2009", 19 pgs.
"U.S. Appl. No. 11/027,493, Notice of Allowance mailed Nov. 23, 2009", 4 Pgs.
"U.S. Appl. No. 11/027,493, Response filed Nov. 12, 2009 to Final Office Action mailed Jun. 2, 2009", 14 pgs.
"U.S. Appl. No. 11/027,493, Response filed Feb. 2, 2009 to Non Final Office Action mailed Feb. 2, 2009", 12 pgs.
"U.S. Appl. No. 11/618,228, Restriction Requirement mailed Feb. 25, 2010", 5 pgs.
"U.S. Appl. No. 11/618,228, Final Office Action mailed Dec. 9, 2010", 12 pgs.
"U.S. Appl. No. 11/618,228, Response filed Oct. 4, 2010 to Non Final Office Action mailed Jun. 4, 2010", 8 pgs.

(Continued)

*Primary Examiner* — Lashonda T Jacobs
(74) *Attorney, Agent, or Firm* — Schwegman, Lunbderg & Woessner, P.A.

(57) ABSTRACT

Systems and methods are described herein to virtualize functions and decentralize services in a flat-graph network of client devices. Other embodiments include apparatus and systems of devices comprising virtual node modules to perform a variety of service functions. Further embodiments include methods for overlaying service functions on a flat-graph network of client devices.

31 Claims, 10 Drawing Sheets

OTHER PUBLICATIONS

"U.S. Appl. No. 11/618,228, Response filed Mar. 29, 2010 to Restriction Requirement mailed Feb. 25, 2010", 7 pgs.

"U.S. Appl. No. 11/618,228, Non-Final Office Action mailed Jun. 4, 2010", 12 pgs.

Ding, et al., "Overlays on Wireless Mesh Network:Implementation and Cross-Layer Searching", (Oct. 2006).

Sedayao, Jeff, "Intel It Overlay", PlanetLab Workshop at HPLABS, May 11, 2006.

* cited by examiner

SYSTEMS AND METHODS FOR VIRTUALIZING FUNCTIONS AND DECENTRALIZING SERVICE DELIVERY IN A FLAT NETWORK OF INTERCONNECTED PERSONAL DEVICES

RELATED APPLICATION

This application is a continuation of U.S. application Ser. No. 11/027,493, filed Dec. 30, 2004, now issued as U.S. Pat. No. 7,693,977, which is incorporated herein by reference in its entirety.

TECHNICAL FIELD

Various embodiments described herein relate generally to networked devices and more particularly to improved systems and methods of enhanced service delivery amongst the networked devices.

BACKGROUND

Information technology has evolved from a highly centralized and provider-driven model towards a more decentralized model, which promotes user empowerment, innovation and personalization. The telecommunications industry makes use of a very hierarchical model of device networking, which governs positioning and roles for the entire system, roughly the analogue of centralized mainframe computing before the advent of the microcomputer. In such a system the end-user sitting at the edge of this network has little or no influence or control on how services they require are delivered to them.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
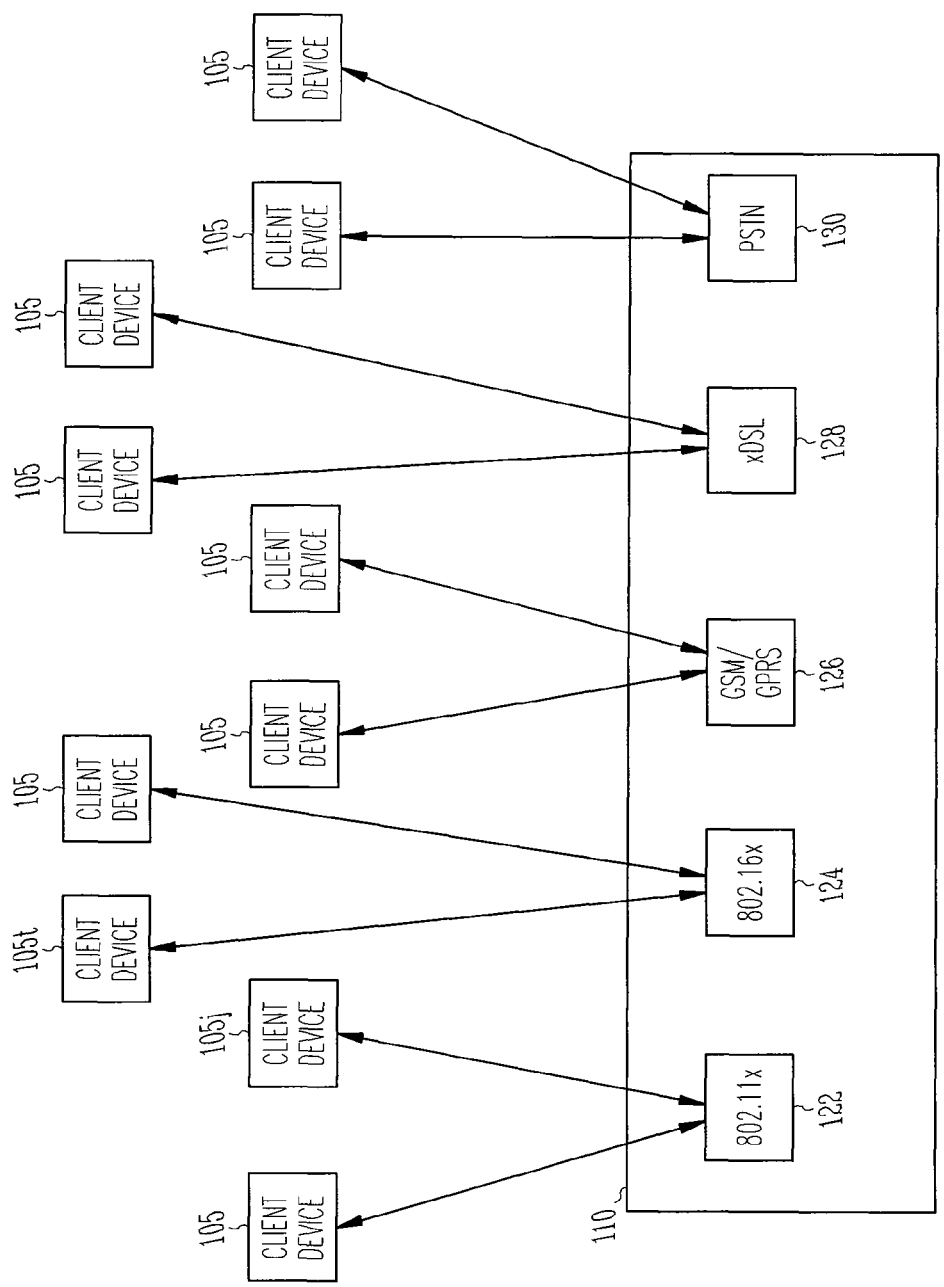
FIG. 1 is a network of interconnected devices according to embodiments of the present invention.

In the following detailed description of embodiments of the invention, reference is made to the accompanying drawings which form a part hereof, and in which is shown by way of illustration specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following detailed description is, therefore, not to be taken in a limiting sense, and the scope of the present disclosure is defined only by the appended claims. Reference is made in the detailed description to communications layers. It is to be understood that such layers refer to the layers of the Open System Interconnection (OSI) model.

The "physical layer" or layer 1 refers to any system for the transmission and reception of bits from one device to another which regulates the transmission over a physical medium, such as a wireless communications link.

The "data link layer" or layer 2 packages raw bits from the physical layer into logical, structured data packets.

The "network layer" or layer 3 determines the route from the source to the destination device and manages operations such as switching, routing and controlling packet congestion.

The "transport layer" or layer 4 allows for reliable end to end delivery of data and receives packets from and sends packets to the network layer as well as sending receipt acknowledgments.

The "session layer" or layer 5 establishes, maintains and ends sessions across the network. The session layer is responsible for name recognition (identification) so only the designated parties can participate in the session.

The "presentation layer" or layer 6 translates from application to network format and vice-versa. The presentation layer is responsible for protocol conversion, character conversion, data encryption/decryption, expanding graphics commands, data compression and provides seamless communication from multiple protocol stacks.

The "application layer" or layer 7 is used for applications specifically written to run over the network, and allows for access to network services that support applications. The application layer directly represents the services that directly support user applications.

Typically, information travels down the layer model, e.g. from the transport to the network, from the network to the data link, and from data link to the physical and is then transmitted over the medium to some device which receives at the "physical layer", and then sends the information up the layer model to the data link, the network, and to the transport layers, in that order. It will be appreciated by those skilled in the art that some network implementations may omit some of the layers of the OSI model or combine them in operation.

FIG. 1 is a network of devices according to embodiments of the present invention. In an embodiment, a plurality of client devices 105 are interconnected through a traditional hierarchical organization of network resources. In such an arrangement, the network 110 is the communications mesh between the client devices 105. In an embodiment, the client devices 105 are configured to exchange wireless signals with the network 110 through some communications network. Examples of communications networks include, without limitation: 802.11x networks (where x is any alphanumeric character used to designate a specific standard) 122, IEEE std. 802.11-1999, published 1999 and later versions (hereinafter IEEE 802.11 standard); 802.16x networks 124, IEEE 802.16 standard signals, IEEE std. 802.16-2001, published 2001 and later versions (hereinafter IEEE 802.16 standard); Global System for Mobile Communications (GSM)/General Packet Radio Services (GPRS) networks 126; Digital Subscriber Line (xDSL) networks 128, information regarding DSL standards can currently be found at the DSL forum website, currently accessible at http://www.dslforum.org; and public switched telephone networks (PSTN) 130. Additional wireless communication protocols may be used without departing from the scope of the present application. In a further embodiment, client devices 105 may be configured to exchange wireline signals with the network 110. In a traditional arrangement, client devices 105 connected to the network through separate communication networks have to pass all their communications through that network. Stated differently, each communication must pass down the hierarchy depicted in FIG. 1 and then pass up the hierarchy to the intended device. This is without regard to the physical proximity of devices.

For the purposes of the present application, reference will be made to two users who are sitting adjacent to each other in a coffee shop. The first user, John, is using his laptop 105*j* which is connected to the network 110 via the 802.11x communications network 122. The second user, Tom, is using his laptop 105*t* which is connected to the network 110 via the 802.16x communications network 124. Tom desires to send a picture to John of the Golden Gate Bridge. Tom's picture must pass down the hierarchy to the network 110 and then be passed up the hierarchy so that it can be sent to John, because in this example they are using different communication networks. This is without regard to the physical proximity of John and Tom. Additionally, if John's laptop 105*j* has the capability to connect to the network using a variety of networks, i.e. 802.11x, GSM/GPRS, or wireline, each of these connection methods need to be separately configured to provide to John, the end-user, a comprehensive and satisfying end-user experience.

Figure 2:
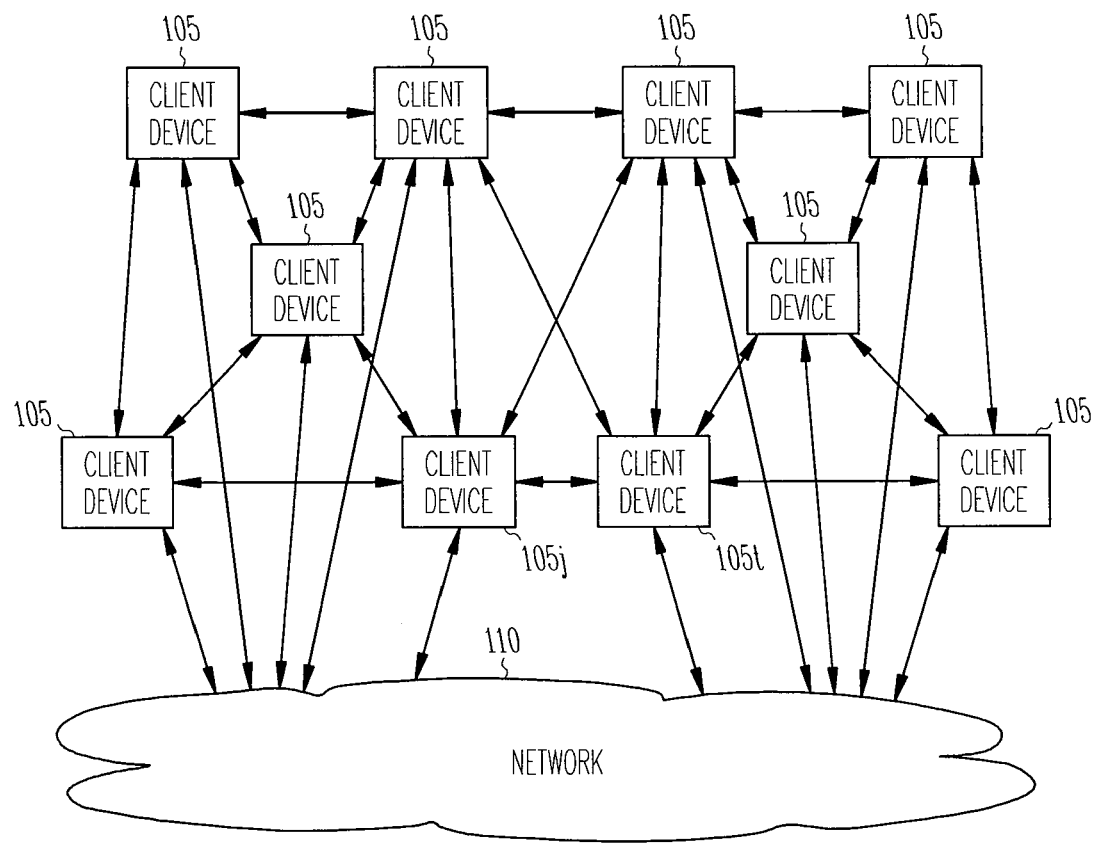
FIG. 2 is a network of interconnected devices according to embodiments of the present invention.

FIG. 2 is a network of interconnected devices according to embodiments of the present invention. In an embodiment, client devices 105 are configured to connect to the network 110. In another embodiment, the client devices 105 are configured to additionally connect to other client devices 105. In such an arrangement, if the client devices 105 are proximate to each other, signals sent from one to the other can be passed directly without the interposition of the network 110. In one embodiment, such an interconnection of devices is a network without structure. In another embodiment, such an interconnection of devices is a flat-graph network. Mention of terms to identify such an interconnection of devices is not meant to be limiting in any manner and any interconnection of devices without the structure or interposition of a traditional network hierarchy is considered to be within the meaning of the terms specifically mentioned. In one embodiment, the flat-graph network includes a homogeneous flat-graph network of devices configured to support the same communications protocol. In another embodiment, the flat-graph network includes a heterogeneous flat-graph network of devices configured to support differing communications protocol, the devices further configured to exchange signals using any suitable communications protocol available.

At least one of the client devices 105 depicted in FIG. 2 is configured to not only send and receive signals from the network, but may be configured also to send and receive signals to neighboring client devices 105. In an embodiment, the signals include network service signals. In an embodiment, the client device 105 is configured to send and receive at least two communications signals of differing types. In another embodiment, the two communications signals are substantially similar. In yet another embodiment, the two communications signals are of any suitable wireless communications protocol. In some examples, a client device 105 may have a wireline connection with the network and further wireless connections with other client devices 105.

While referring to FIG. 2, the present discussion can now return to the example of John and Tom in the coffee shop described above. With John's laptop 105*j* and Tom's laptop 105*t* deployed on a flat-graph network of devices, their ability to connect is dependent on their physical proximity. As discussed above, the client devices 105 are configured to simultaneously support multiple communication networks. If John's laptop 105*j* was configured to support both 802.11x and 802.16x, communications between John and Tom can be achieved without the interposition of a traditional network. In this example, the communications between the devices 105*j* and 105*t* would use an 802.16x signal. Use of such agile and re-configurable client devices 105 empowers the end-user and allows the end-user to operate without the structure of a network interposed between them and the resources they are using. Resources may include, without limitation, computing, communications or storage.

Figure 3:
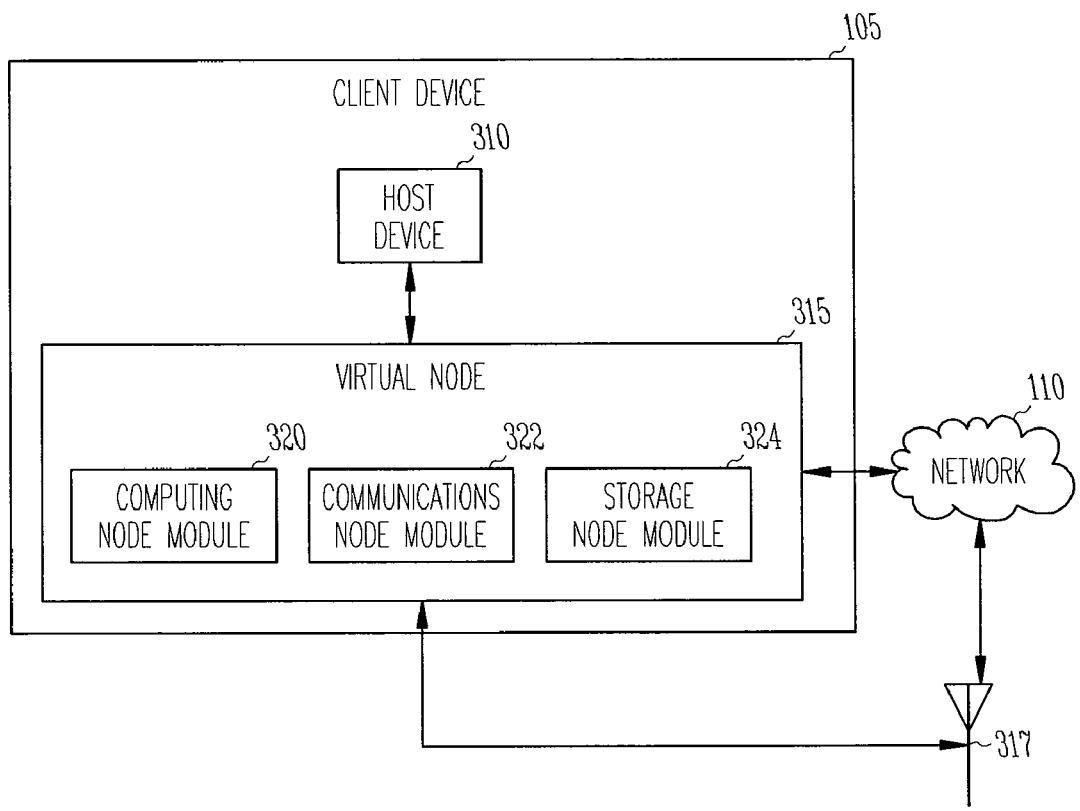
FIG. 3 is a high level block diagram of a device, such as the device in FIG. 2, according to embodiments of the present invention.

FIG. 3 is a high level block diagram of a device, such as depicted in FIG. 2, according to embodiments of the present invention. In an embodiment, the device is a client device 105 such as that described above with respect to FIG. 1 and FIG. 2. In an embodiment, the client device 105 comprises a host device 310 and a virtual node 315. In a further embodiment, the virtual node 315 is operably coupled to an antenna 317. The antenna 317 may include one or more of a patch, omnidirectional, beam, monopole, dipole, and rhombic antenna, among others. Though the antenna 317 depicted as external to the client device 105 it will be appreciated that the antenna 317 may be integral to the client device 105 and such depiction is not to be taken in any limiting way.

In an embodiment, the host device 315 is configured to execute software applications, such as an operating system and user applications. In an embodiment, the operating system and the user applications include applications that perform some network operations. Examples of such applications are many and are well known to those skilled in the art. Any application that causes some network signal to be sent is considered to be within the scope of the present discussion.

In an embodiment, the virtual node 315 is further comprised of a computing node module 320, communications node module 322 and storage node module 324. Though depicted in the singular, each of the nodes of the virtual node 315 may be further expanded to include multiples such that the virtual node 315 may contain more than one computing node module 320 for example. Traditionally each client device 105 was configured with a one-to-one mapping of their specific function in the network. For example, a traditional end node client device 105, such as in FIG. 1, is configured to support the sending and receiving of network signals. Such a client device 105 has a one-to-one mapping of its function, the sending and receiving of network signals, and is not configured to support other communications capabilities. The end node is just that, a node at the end of the network 110. The virtual node 315 described here removes the need for such one-to-one mapping. Each client device 105 can be one of a number of devices on the network. For example, the communications node module 322 can be configured to virtually provide services that are typically associated with network routers and switches.

With respect to FIG. 3, the example of John's laptop 105*j* may be used again as a specific example. As discussed above with respect to the discussion of FIG. 2, John's laptop 105*j* is configured to not only support 802.11x, but also 802.16x. Additionally, John's laptop 105*j* has contained within it a virtual node as described above. The deployment of a communications node module within the virtual node of John's laptop 105*j* provides that device the ability to not only send and receive network signals addressed to itself, but to receive network signals addressed to other devices and forward them appropriately. John's laptop 105*j* is no longer an end node, but a full fledged network node supporting the deconstruction of traditional hierarchical network arrangements and allowing for user to user communications without the interposition of traditional network arrangements.

In a further embodiment, the modules of the virtual node 315 provide the client device 105 the ability to divide tasks amongst multiple devices on the network. For example, the computing node module 320 may request computing services from neighboring client devices 105 in order to render a frame of video. The computing node module 320 can divide up the task and distribute it on an ad hoc basis without any preformed structure, making use of the client devices 105 that it finds accessible when it needs such processing performed. Additionally, the computing node module 320 can receive such service requests from other client devices 105 and perform those services, as well as forward such service requests to other client devices 105. In another example, the storage node module 324 may request or provide distributed storage services to accessible client devices 105. In an embodiment, the modules of the virtual node 315 may be implemented wholly in hardware, wholly in software, or in some mix of hardware and software.

Figure 4:
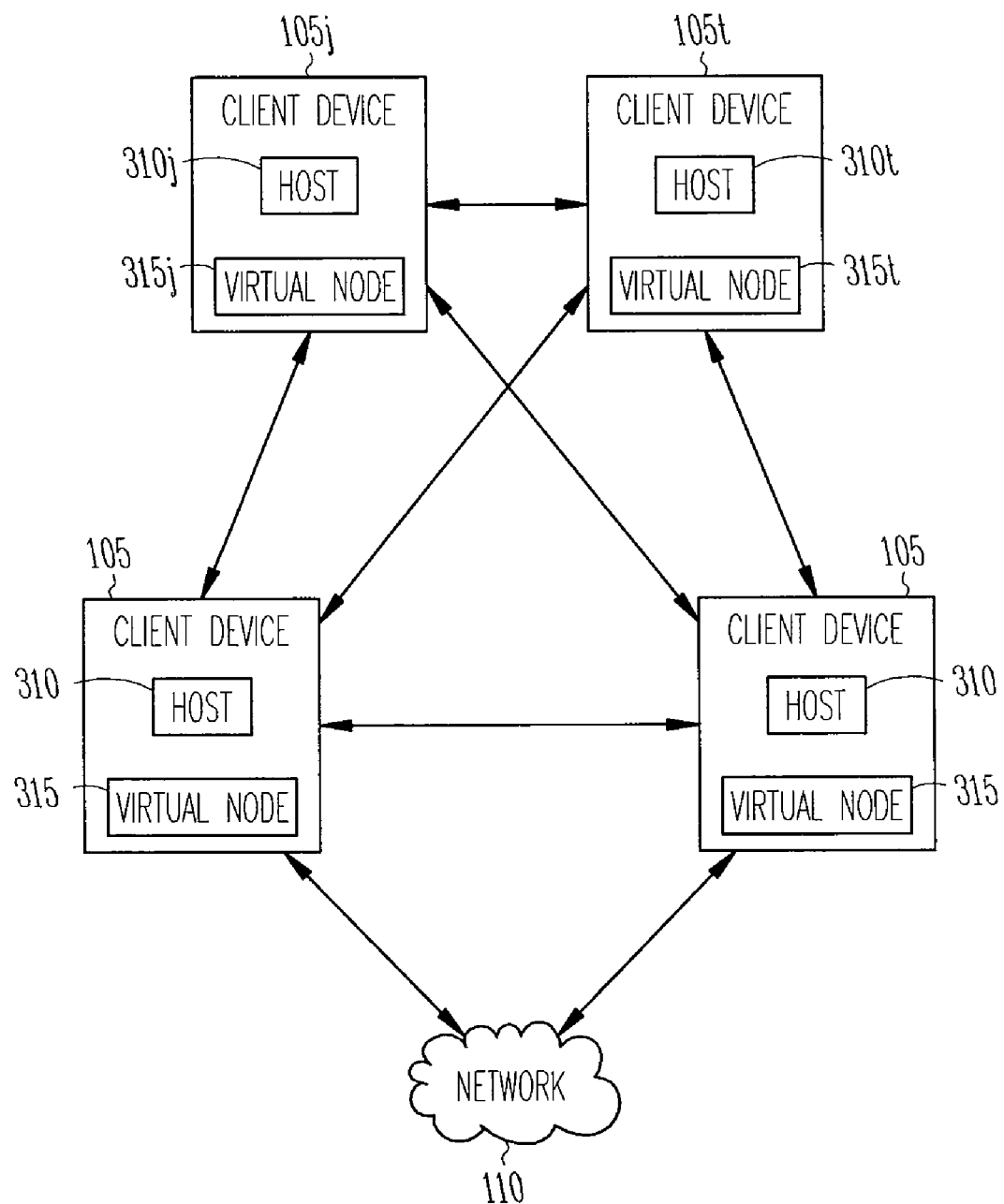
FIG. 4 is a high level block diagram of a system of devices, such as depicted in FIG. 3, according to embodiments of the present invention.

FIG. 4 is a high level block diagram of a system of devices, such as depicted in FIG. 3, according to embodiments of the present invention. In an embodiment, FIG. 4 represents a flat-graph network of devices, such as client devices 105 discussed above. Each of the client devices 105 is configured to communicate with accessible client devices 105 as well as the network 110. Each of the client devices 105 is configured to include a virtual node 315 as described above. Through the use of the virtual node 315, each of the client devices 105 is capable of providing distributed computing, communications and storage services throughout the flat-graph network.

Returning to the example of John and Tom in the coffee shop while referring to FIG. 4, John's laptop 105*j* is performing a complicated processing function. The host device 310*j* might be overloaded with this function and requests services from the computing node module of the virtual node 315*j*. The computing node module accesses the services of the accessible client devices, of which Tom's laptop 105*t* is one. The virtual node 315*t* of Tom's laptop assists with computing resources and responds to John's laptop with whatever results were required. There are many examples of distributed, or grid computing, known, such as SETI@home. Information regarding the SETI@home project can currently be found on the SETI@home website currently accessible at http://seti-athome.ssl.berkeley.edu/. However, such distributed computing applications require the interposition of a structured network between devices over which the application is distributed. In the example shown above, the request for services and response are sent and received without such a structured network. The use of a virtualized node in client devices 105 empowers the end user and enables their devices to operate more efficiently.

Figure 5A:
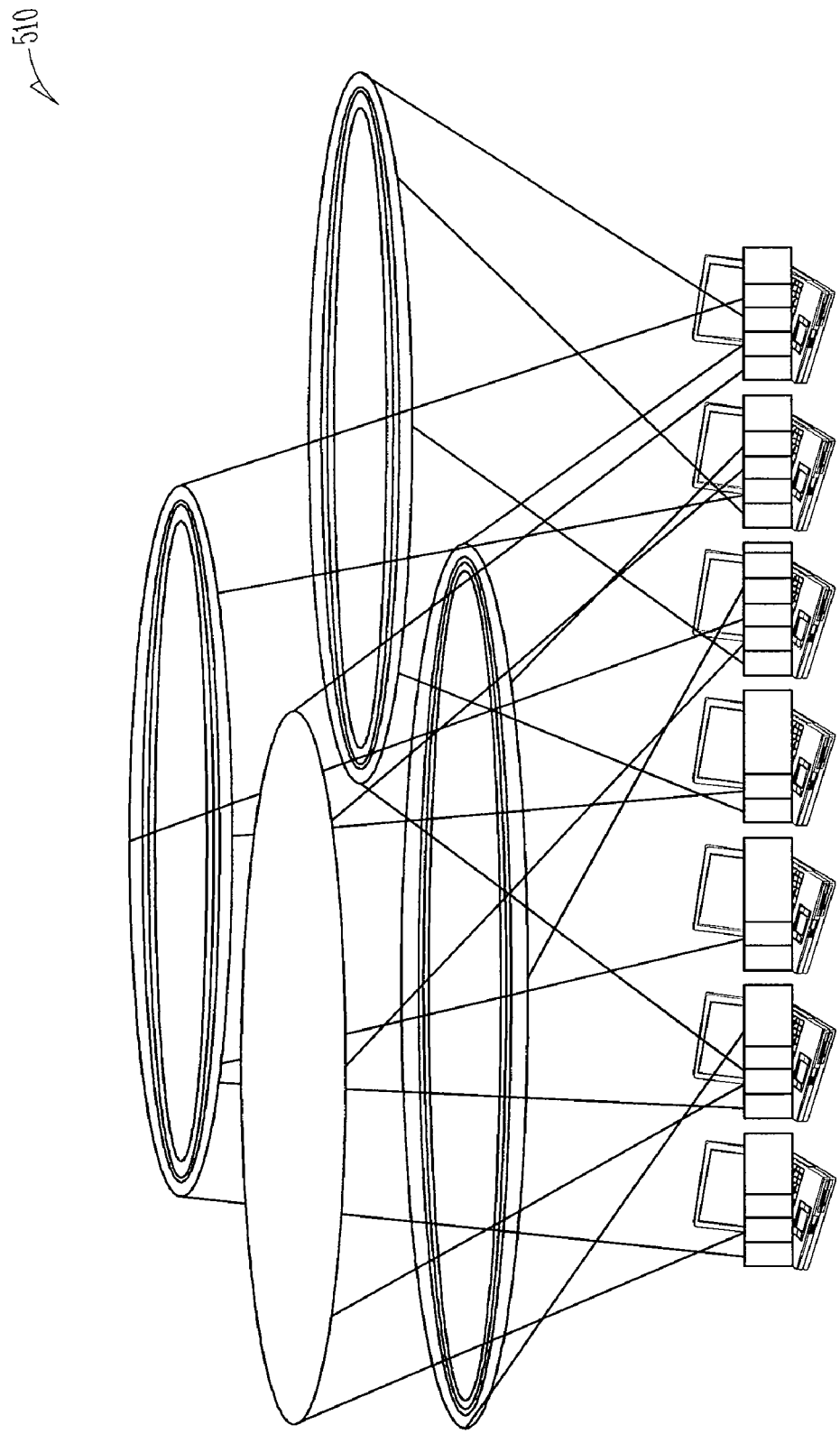
FIG. 5A is a high level diagram of a network of devices according to embodiments of the present invention.

FIG. 5A is a high level diagram of a network of devices according to embodiments of the present invention. In an embodiment, overlays provide an organized and layered architecture to support the provisioning and management of services over a flat-graph network. FIG. 5A depicts such an arrangement. The network 500 in FIG. 5A shows the computational model for the programming of networking and computing services over a flat-graph network. In such an arrangement, the service architecture has some structure and organization in a way roughly similar to the way that processes are spawned or inherited in an operating system (for example, the parent-child relationship of a process to other processes that it spawns). In the case of overlays, however, the organized structure used to deliver infrastructure, network content or applications services is necessary. With respect to an individual device, the overlay provides a mechanism to partition or slice the entirety of the device's capabilities, including, without limitation, computing, communications, and storage. For example, the overlay provides a mechanism to partition a portion of the communications capabilities to support ongoing communications in support of a particular overlay service. In another example, overlays serve as a programmability model for internet services and as a provisioning model for internet resources.

Figure 5B:
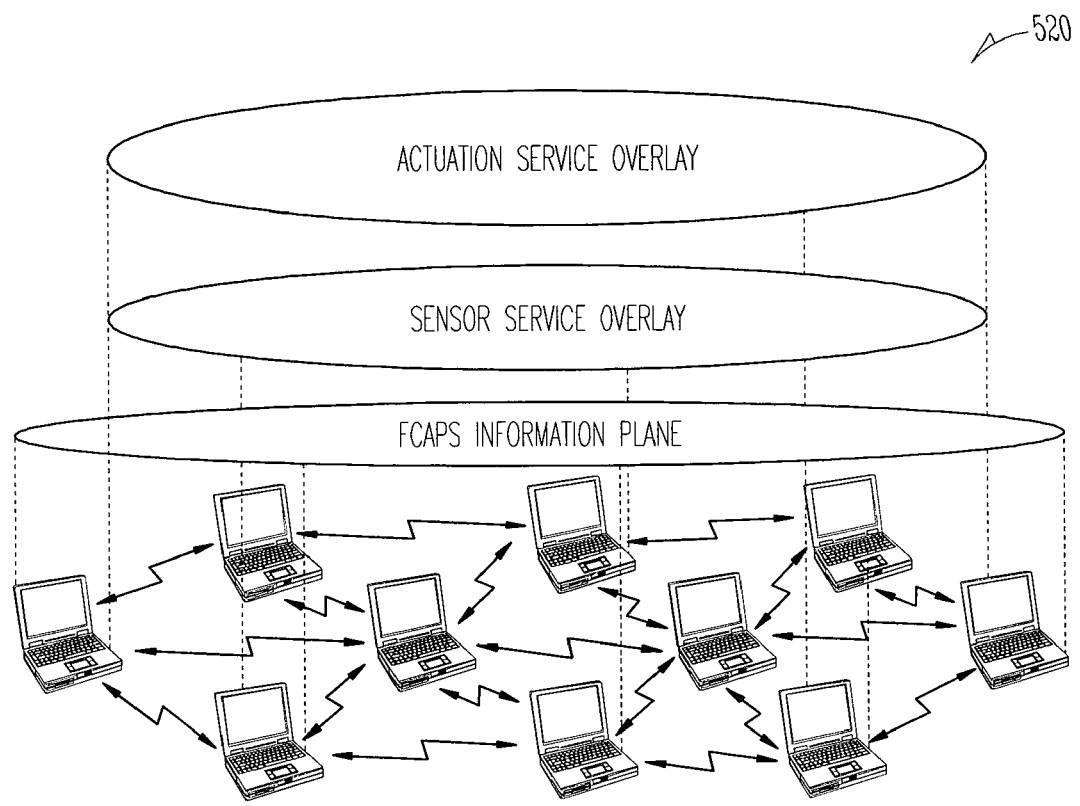
FIG. 5B is a high level diagram of a network of devices according to embodiments of the present invention.

FIG. 5B is a high level diagram of a network of devices according to embodiments of the present invention. The network 510 in FIG. 5B depicts overlay formations employed to support management/autonomic services in a flat-graph network. In addition the overlays can also support many different classes of distributed communications, computing or storage service functions or signaling.

Figure 5C:
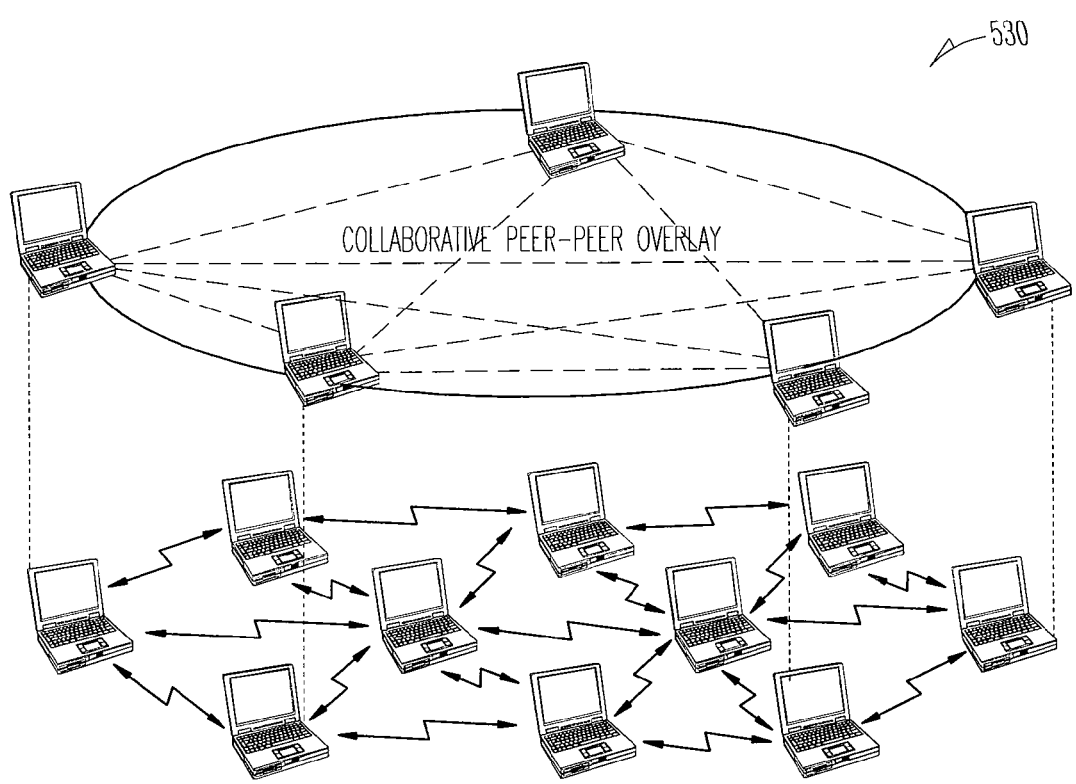
FIG. 5C is a high level diagram of a network of devices according to embodiments of the present invention.

FIG. 5C is a high level diagram of a network of devices according to embodiments of the present invention. The network 520 in FIG. 5C depicts overlay formations employed to support collaborative peer-to-peer services in a flat-graph network.

Figure 5D:
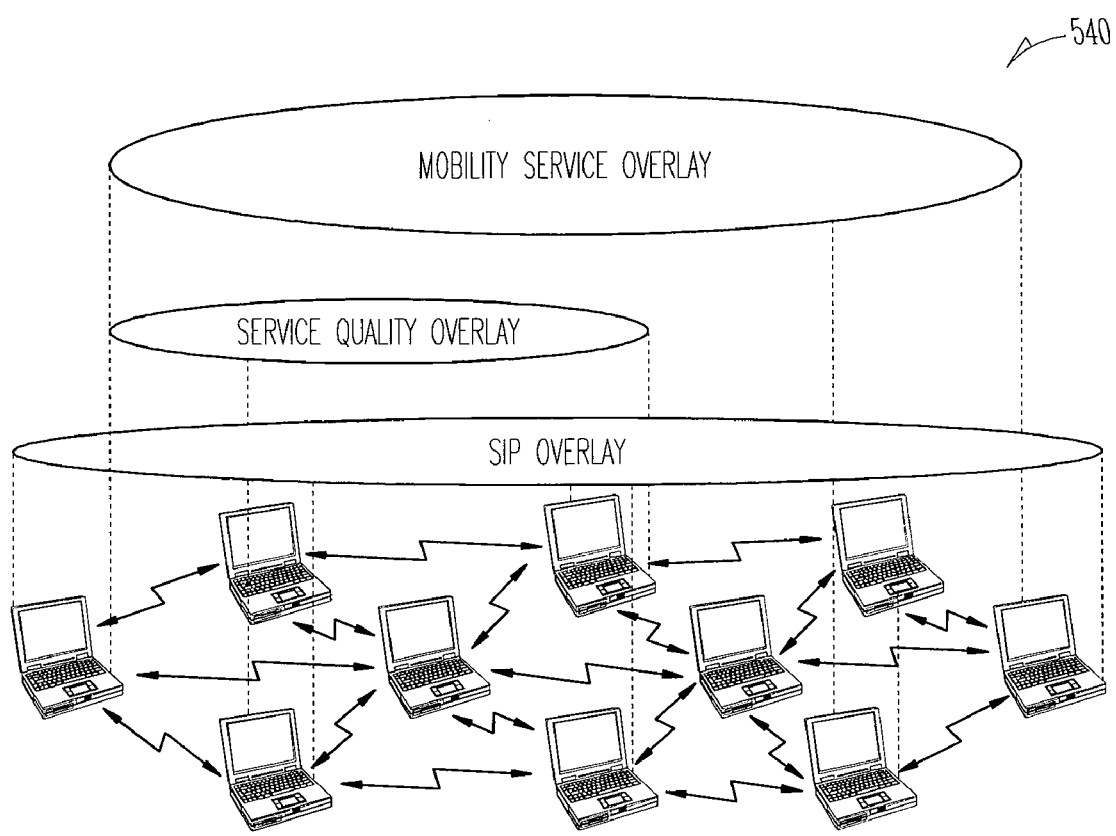
FIG. 5D is a high level diagram of a network of devices according to embodiments of the present invention.

FIG. 5D is a high level diagram of a network of devices according to embodiments of the present invention. The network 530 in FIG. 5D depicts overlay formations employed to support enhanced network services, such as Quality of Service (QOS) in a flat-graph network.

In an embodiment, the modules of the virtual node 315 in the client device 105 discussed above with respect to FIG. 4 are configured to overlay their service functions on the network to which the client device 105 is communicating. In an embodiment, the service functions are overlayed on the network through the operations of the modules of the virtual node 310. The network may include, without limitation, a traditional hierarchical network of devices, or a flat-graph network of devices. Each of the service functions the modules support would be overlayed individually onto the network. Returning to the example of John's processing task, the processing services required by the computing node module of John's laptop 105*j* would be overlayed onto the flat-graph network of FIG. 2. The computing node module of the virtual node module 315*j* is configured to provision and deploy those service functions onto the network. Through such operations, the task is distributed to the client devices accessible on the flat-graph network.

Figure 6A:
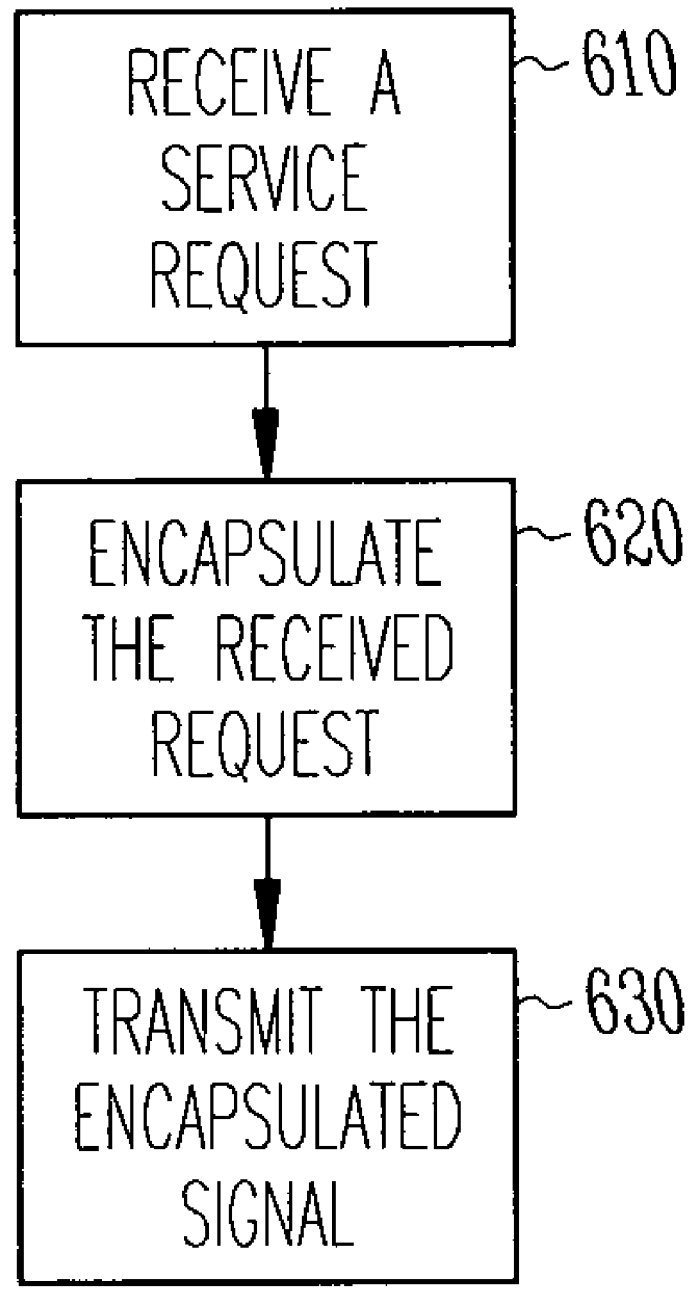
FIG. 6A is flowchart of a method that could be carried out on a device, such as the device in FIG. 3, according to embodiments of the present invention.

FIG. 6A is flowchart of a method that could be carried out on a device, such as the depicted in FIG. 3, according to embodiments of the present invention. In an embodiment, FIG. 6A depicts a method of overlaying a service request onto a communications network. At block 610 a request for services is received from an application at a communications layer at or above the current layer. In an embodiment, the current layer is at or above the network layer, or layer 3. In an embodiment, the current layer is the layer at which the virtual node module 315 of the client device 105 is operating. In an embodiment, the virtual node module 315 is configured to encapsulate the received request for services in a communications signal that is constructed to be sent using the current layer at block 620. At block 630 the encapsulated signal is transmitted using the current layer to a network of devices. In an embodiment, the signal is transmitted to a flat-graph network of devices configured similarly to the device described above with respect to FIG. 3. Though FIG. 6A represents a single communications request, it will be understood to those skilled in the art that this may represent a stream of signals constituting a single conversation between devices.

Figure 6B:
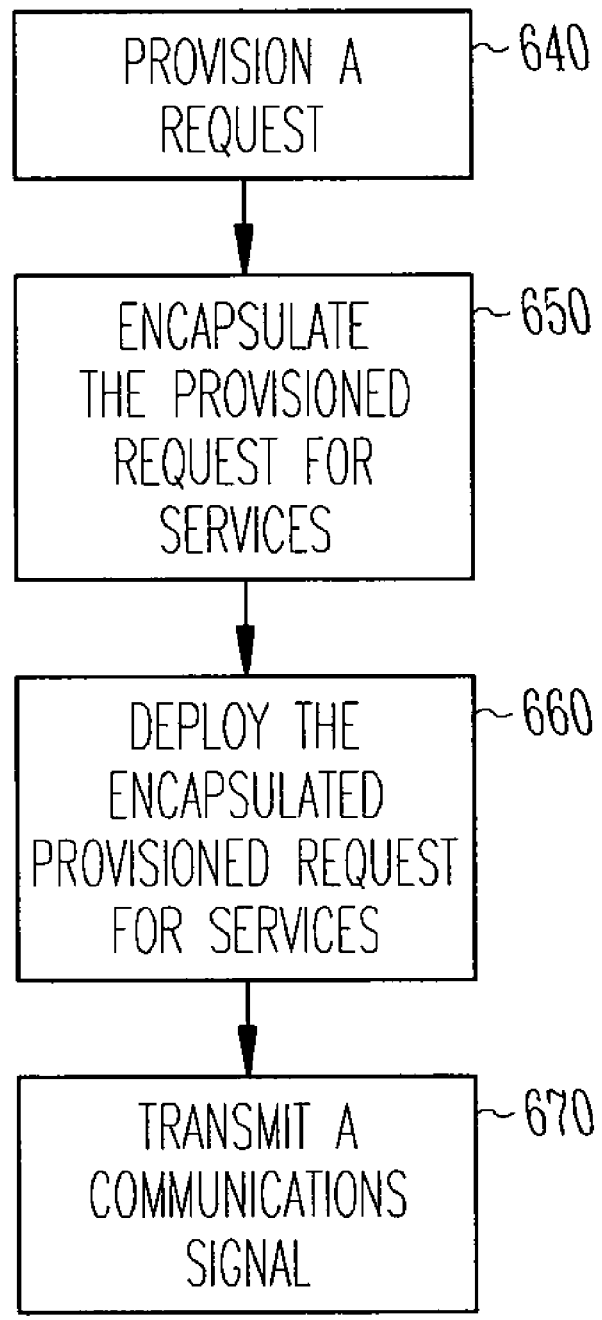
FIG. 6B is flowchart of a method that could be carried out on a device, such as the device in FIG. 3, according to embodiments of the present invention.

FIG. 6B is flowchart of a method that could be carried out on a device, such as the depicted in FIG. 3, according to embodiments of the present invention. At block 640 the virtual node 315 provisions a request for services from a communications layer at or above the current layer. In an embodiment, the current layer is at or above the network layer, or layer 3. The virtual node module 315, at block 350 encapsulates the provisioned request for services in a communications signal that is constructed to be deployed using the current layer. At block 660, the virtual node 315 deploys the provisioned request. In an embodiment, deploying includes allocating, or partitioning, a portion of the communications channel for the provisioned request. Through such an example, a hard or soft overlay can be deployed over a network of devices to support services that are more durable. At block 670 the communications signal is transmitted to the network. In an embodiment, the network is a network of devices, with at least one of the devices configured similarly to the client device 105 described above with respect to FIG. 3.

The use of overlays on a flat-graph network provides a means to manage and distribute the complexity inherent in flat-graph networks. Overlays provide this means by partitioning the provisioning and managing of the distributed resources and services. Overlays further provide means to reduce state in such an arrangement. Overlays can support multiple services, including, without limitation, computing overlays, communications overlays and data storage overlays. In an embodiment, overlay provisioning and overlay management are roughly analogous to operating system processes on a single computing platform. However, the overlays provide appropriate context to the services being provided for in the distributed nodes in a flat-graph network.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments and other embodiments not specifically described herein will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. Additionally, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

What is claimed is:

1. A communications device, comprising:
a virtual node operable to couple to one or more software overlays providing service functions on a flat network, wherein the virtual node is configured to receive network service signals of a first communications type, the network service signals comprising at least one network service signal addressed to a second device, and is to forward the at least one network service signal of the first type to the second device as a network service signal of a second communications type without the structure of a network interposed between the device and the second device.

2. The device of claim 1, wherein the network service signal includes at least one of the following:
communications signals;
computing signals; and
storage signals.

3. The device of claim 2, wherein the at least one network service signal is overlayed onto a heterogeneous flat network of wireless communications devices.

4. The device of claim 1, wherein the first communications type and the second communications type are substantially similar.

5. The device of claim 3, wherein the first communications type and the second communications type are different.

6. The device of claim 1, wherein the first communications type and the second communications type are any suitable wireless communications protocol.

7. The device of claim 1, wherein the device is connected to a peer-to-peer communications network.

8. The device of claim 7, wherein the communications network includes a homogeneous flat network.

9. The device of claim 7, wherein the communications network includes a heterogeneous flat network.

10. A communications device, comprising:
a host device and a virtual node; and
the virtual node operable to couple to one or more software overlays providing service functions on a flat network, wherein the virtual node is configured to provide a service function to the host device or a second device communicatively coupled to the device over the network, the service function to include each one of the following: computing node services, network node services, and storage node services.

11. The device of claim 10, wherein the service functions are overlayed onto a heterogeneous flat network of wireless communications devices.

12. The device of claim 10, wherein the device is connected to a peer-to-peer communications network.

13. The device of claim 12, wherein the flat-graph communications network includes a heterogeneous network.

14. The device of claim 12, wherein the communications network includes a homogeneous flat network.

15. The device of claim 10, wherein the service function includes receiving a network signal and providing at least one or more of the following: computing node service functions, network node service functions, and storage node service functions.

16. A system comprising:
a host device and a virtual node;
the virtual node operable to couple to one or more software overlays providing service functions on a flat network, wherein the virtual node is configured to provide a service function to the host device or a second device communicatively coupled to the device over the network, the service function to include each one of the following: computing node services, network node services, and storage node services; and
at least one antenna communicatively coupled to the virtual node.

17. The system of claim 16, wherein service functions include at least one or more of the following peer-to-peer services:
computing services;
communications services; and
storage services.

18. The system of claim 17, wherein communications services include functions for the purposes of receiving, manipulating, and transmitting network signals.

19. An apparatus comprising:
a first wireless communications device, wherein the first communications device comprises:
a virtual node operable to couple to one or more overlays providing service functions on a flat network, wherein the virtual node is configured to provide a service function, the service function to include each of the following: computing node services, network node services, and storage node services; and
a second communications device configured to perform the following operations:
receiving a service request from a communications layer higher than a current layer;
encapsulating the received service request in a communications signal constructed to be communicated using the current layer; and
transmitting the encapsulated communications signal to a flat network of communications devices.

20. The apparatus of claim 19, further comprising:
further communications devices, wherein at least one of the further communications devices is configured to perform the following operations:
provisioning a request for services of a communications layer at or above a current layer;
encapsulating and deploying the request in a communications signal constructed to be communicated using the current layer; and
transmitting the communications signal to a flat network of communications devices.

21. The apparatus of claim 20, wherein the first, second, and further communications devices are interconnected by a peer-to-peer network.

22. A method comprising:
provisioning a request for services of a communications layer at or above a current layer, wherein the current layer is at or above a network layer;
encapsulating and deploying the request in a communications signal constructed to be communicated using the current layer; and
transmitting the communications signal to a flat network of communications devices, wherein at least one of the communications devices includes a virtual node device coupled to one or more overlays providing peer-to-peer service functions on the flat network, and wherein the communications devices in the flat network are configured to exchange services, the services to include at least one or more of the following: computing services, communications services and storage services.

23. A method comprising:
receiving a service request from a communications layer higher than a current layer;
encapsulating the received service request in a communications signal constructed to be communicated using the current layer; and
transmitting the encapsulated communications signal to a flat network of communications devices, wherein at least one of the communications devices includes a virtual node device coupled to one or more software overlays providing peer-to-peer service functions on the flat network and without the structure of a hardware network interposed between the at least one communication device and the flat network.

24. The method of claim 23, wherein the current layer is at or above the network layer.

25. The method of claim 23, wherein the flat network of communications devices includes at least one communications device, the at least one communications device further comprising:
a host device; and
a virtual node device coupled to the host device, wherein the virtual node device is configured to provide a service function to the host device or a second device communicatively coupled to the apparatus over a network, the service function to include at least one or more of the following: computing node services, network node services, and storage node services.

26. A non-transitory machine-readable medium having machine-executable instructions contained therein which when executed perform the following operations:
receiving a service request from a communications layer higher than a current layer;
encapsulating the received service request in a communications signal constructed to be communicated using the current layer; and
transmitting the encapsulated communications signal to a flat network of communications devices,
wherein at least one of the communications devices includes a virtual node device coupled to one or more software overlays providing peer-to-peer service functions on the flat network and without the structure of a hardware network interposed between the at least one communication device and the flat-graph network.

27. The non-transitory machine-readable medium of claim 26, wherein the current layer is at or above a network layer.

28. The non-transitory machine-readable medium of claim 26, wherein the flat network of communications devices includes at least one communications device, the at least one communications device further comprising:
a host device; and
a virtual node device coupled to the host device, wherein the virtual node device is configured to provide a service function to the host device or a second device communicatively coupled to the virtual node device over a network, the service function to include at least one or more of the following: computing node services, network node services, and storage node services.

29. A non-transitory machine-readable medium having machine-executable instructions contained therein, which when executed perform the following operations:
- provisioning a request for services of a communications layer at or above a current layer, wherein the current layer is at or above a network layer;
- encapsulating and deploying the request in a communications signal constructed to be communicated using the current layer; and
- transmitting the communications signal to a flat network of communications devices, wherein at least one of the communications devices includes a virtual node device coupled to one or more overlays providing peer-to-peer service functions on the flat network, and wherein the communications devices in the flat network are configured to exchange services, the services to include at least one or more of the following: computing services, communications services, and storage services.

30. The non-transitory machine-readable medium of claim 29, wherein the current layer is at or above the network layer.

31. The non-transitory machine-readable medium of claim 29, wherein the flat network of communications devices includes at least one communications device, the at least one communications device further comprising:
- a host device; and
- a virtual node device coupled to the host device, wherein the virtual node device is configured to provide a service function to the host device or a second device communicatively coupled to the apparatus over a network, the service function to include at least one or more of the following: computing node services, network node services, and storage node services.

* * * * *

UNITED STATES PATENT AND TRADEMARK OFFICE
CERTIFICATE OF CORRECTION

| | | |
|---|---|---|
| PATENT NO. | : 7,975,040 B2 | Page 1 of 1 |
| APPLICATION NO. | : 12/754338 | |
| DATED | : July 5, 2011 | |
| INVENTOR(S) | : John Du et al. | |

It is certified that error appears in the above-identified patent and that said Letters Patent is hereby corrected as shown below:

On the title page, in item (74), in "Attorney, Agent, or Firm", in column 2, line 1, delete "Lunbderg" and insert -- Lundberg --, therefor.

In column 8, line 38, in Claim 5, delete "3," and insert -- 1, --, therefor.

In column 11, line 5, in Claim 29, delete "cunent" and insert -- current --, therefor.

In column 12, line 2, in Claim 30, delete "cuffent" and insert -- current --, therefor.

Signed and Sealed this
Eighth Day of November, 2011

David J. Kappos
*Director of the United States Patent and Trademark Office*